No. 714,699. Patented Dec. 2, 1902.
D. C. HUMPHREYS.
DAMPER REGULATOR FOR HOT WATER HEATERS.
(Application filed Mar. 10, 1902.)
(No Model.) 2 Sheets—Sheet 1.
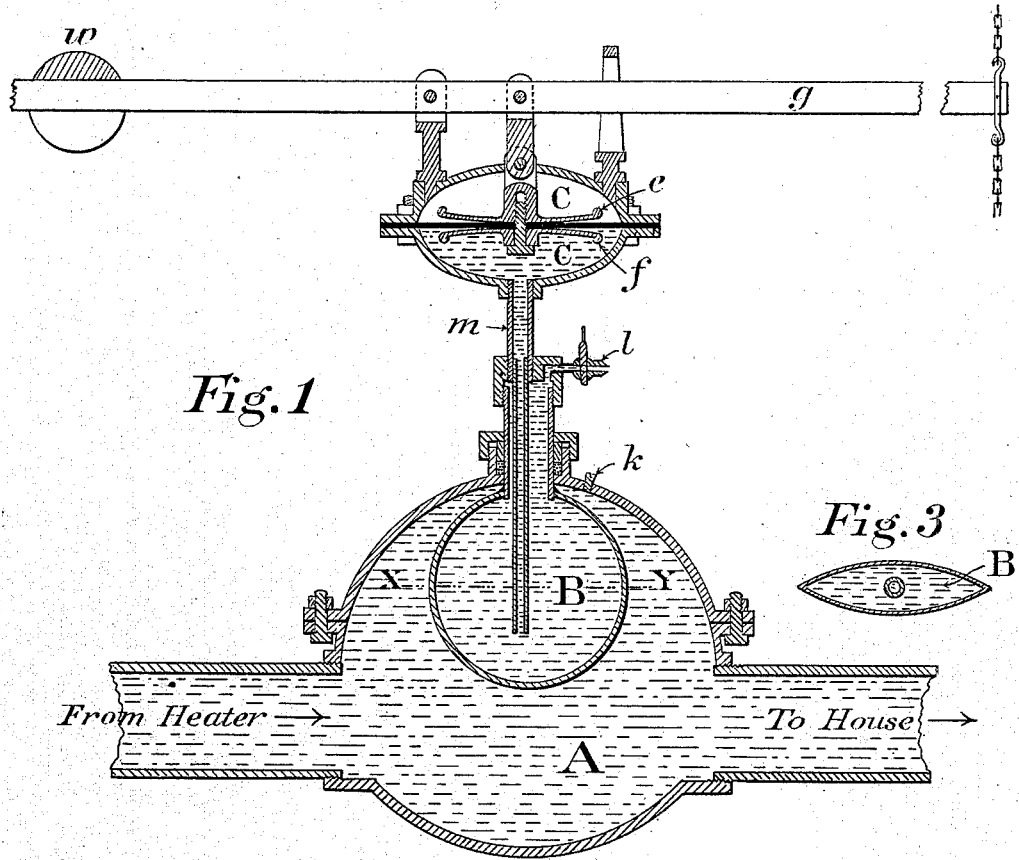
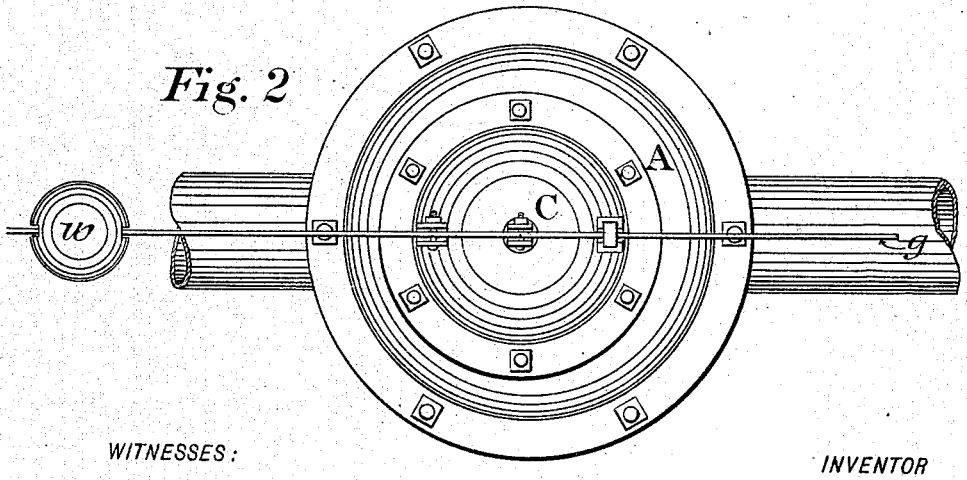
WITNESSES: INVENTOR
W. LeC. Stevens. David Carlisle Humphreys
L. W. Smith. By Franklin N. Hough
 atty.
THE NORRIS PETERS CO., PHOTO-LITHO., WASHINGTON, D. C.

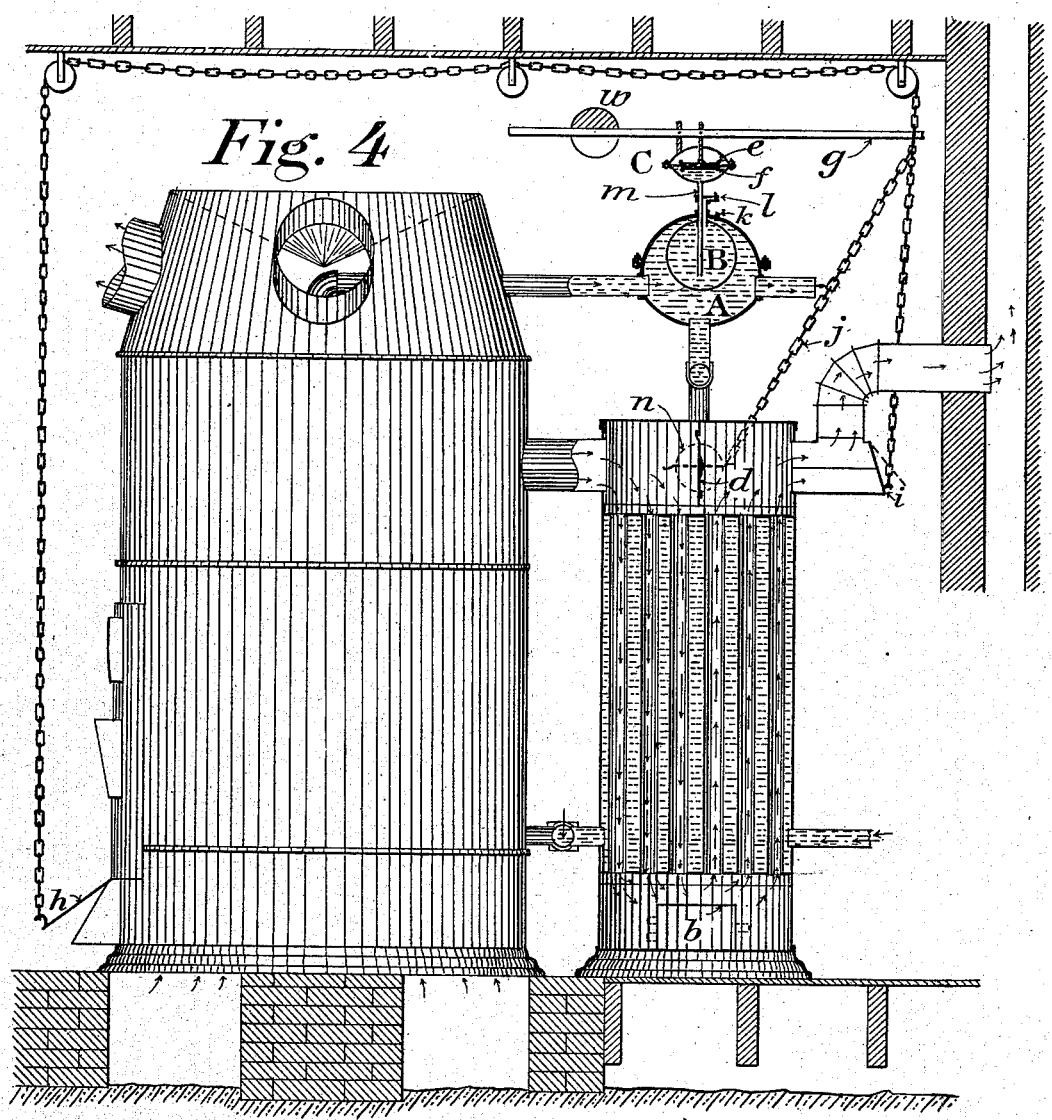

UNITED STATES PATENT OFFICE.

DAVID CARLISLE HUMPHREYS, OF LEXINGTON, VIRGINIA.

DAMPER-REGULATOR FOR HOT-WATER HEATERS.

SPECIFICATION forming part of Letters Patent No. 714,699, dated December 2, 1902.

Application filed March 10, 1902. Serial No. 97,659. (No model.)

*To all whom it may concern:*

Be it known that I, DAVID CARLISLE HUMPHREYS, a citizen of the United States, residing at Lexington, in the county of Rockbridge and State of Virginia, have invented a new and useful Improvement in Damper-Regulators for Hot-Water Heaters, of which the following is a specification.

My invention relates to the automatic regulation of heaters used for house-warming, and applies equally well to the regulation of a hot-water system or of a combination hot-air and hot-water system, the object of the improvement being to automatically close the dampers, and thereby prevent the water from boiling or rising above a certain predetermined temperature. I obtain this object by the mechanism illustrated in the accompanying drawings, in which—

Figure 1 shows a section of the essential parts. Fig. 2 shows a plan or top view of the regulator; and Fig. 3 shows a horizontal section of the vessel B on the line X Y, Fig. 1. Fig. 4 is a view showing the various parts of the invention in operative connection.

The same letters refer to identical parts throughout the several views.

My damper-regulator consists of the following essential parts: A vessel (marked A) made up of two sections bolted together is filled with the hottest outflowing water from the heater. This vessel is cast and made in two sections bolted together, as shown, forming a water-tight joint. The lower portion of A has holes for attaching the pipes for the entering and outgoing water. The hottest water which leaves the heater is made to pass through this vessel A. In the upper part of A is a plug $k$ for letting air out.

Inside of the vessel A is another vessel, (marked B,) of shape shown in Figs. 1 and 3, made of thin metal with soldered joints and having no passage communicating with A. Soldered to the top of B is a short tube passing out of A through water-tight packing and covered by a cap in which is an air-cock $l$, and through said cap passes a pipe of small bore, $m$, extending from near the bottom of B to a third vessel C, which has an elastic diaphragm across its center. The vessel B, held in the vessel A by means of a ring or collar on the tube $m$, the lower portion of the vessel C, and the connecting-pipe $m$, all intercommunicating, are completely filled with water, said water being put in before the diaphragm and the upper portion of C are put on. The air-cock $l$ serves to let the air out of the upper portion of B, while the water enters through the pipe $m$.

The inclosed intercommunicating spaces in B, C, and $m$ are to be made absolutely air-tight. To prevent the possibility of air passing through the elastic diaphragm, the upper part of C may be partly filled with water. (Not shown in the drawings.)

The construction of the vessel C is similar to that of the ordinary automatic damper-regulators for low-pressure steam-boilers, but differing therefrom in two important particulars: First, it has underneath the elastic diaphragm a nearly-flat circular plate, (marked $f$,) as well as the plate $e$ on top of the diaphragm; second, the lever-arm $g$ extends both ways from the fulcrum, and the weight $w$ may be placed on either side of the fulcrum. The lower plate $f$ is bolted to the upper plate $e$ at the center, and to the said upper plate $e$ a post is attached, which passes through a hole in the cover of C, loosely fitting, so as to allow air to pass freely. This post is hinged to the lever-arm $g$ near the fulcrum.

A movable weight $w$ rests on the lever-arm $g$ and may be placed on either side of the fulcrum. The top part of C is bolted to the lower part in the usual way. To one end of the lever $g$ a chain is attached for operating dampers in the usual way.

As the operative parts in connection with which the present improvements are used are clearly illustrated in the drawing forming a part of my application Serial No. 43,337, it is not deemed necessary to illustrate such details in the present drawing.

Fig. 4 shows a method of attaching my automatic damper-regulator to a combination hot-air and hot-water heater, it being peculiarly important in such heaters to prevent the water from boiling. It will work equally well on a simple hot-water heater, in which case the chain $j$ would be omitted. When the diaphragm in the vessel C is raised, the right end of the lever $g$ will be forced up, which will allow the draft-door $h$ to close and raise the door $i$, which will allow cold air to enter the smoke-pipe, thus checking the draft. In addition to operating these two doors, which are common in most heaters, my damper-regulator may operate the damper-door $d$. A pull on the chain $j$ would throw this door in the position shown by dotted lines, which would allow the smoke and hot gases to go direct to the chimney-flue instead of passing through the flues of the economizer and heating the water surrounding these flues and contained in said economizer.

*Operation of the damper-regulator.*—Use is made of the principle that vapor of water will form at all temperatures, provided the pressure on the water is sufficiently reduced. Thus if hot water be placed under the receiver of an air-pump and the air exhausted the water will boil. I therefore depend on the pressure of the vapor of water and not on the expansion of the water itself by heat to work the diaphragm, as is usually done in automatic regulators constructed in a way somewhat similar to mine. Where the expansion of the water is relied on to raise the diaphragm, the dampers close too slowly to be satisfactory. The elastic diaphragm is at all times pushed upward by the tension of the vapor in the vessel B, the amount of that tension depending on the temperature of the water in B, which is the same as that in A. When the vapor forms in B, occupying the upper portion and pushing the water from the bottom of B through the pipe $m$ into the lower half of C, the diaphragm rises. The elastic diaphragm is at all times pushed downward by the pressure of the atmosphere, which is practically constant. This atmospheric pressure must be overcome before the diaphragm will rise. If the weight be placed on the left of the fulcrum, as shown in the drawings, the action of the weight will assist the vapor-pressure, and the two acting jointly will overcome the pressure of the atmosphere. It is therefore obvious that the vapor-pressure may be that due to water at a lower temperature than 212° Fahrenheit. When the elastic diaphragm is forced up by the joint action of the vapor-pressure and the weight, the lever-arm $g$ will be forced up, and the chain attached to it will cause the dampers or draft-doors to close, thus preventing any further material increase in the temperature of the water in A. Since the action depends on the formation of vapor, the vapor will continue to form till the dampers are completely closed, if the fire is sufficiently hot. It is also obvious that the farther the weight is placed from the fulcrum the greater will be the assistance which the weight gives to the vapor, and consequently the lower the temperature at which the dampers will be closed.

If the expansion-tank of the hot-water heating system be located above the highest radiator, or if the water be somewhat cooled before reaching the highest radiator, by doing some heating as it ascends, the water in the furnace may be heated considerably above 212° Fahrenheit without boiling. In extremely cold weather it may be desirable to make the water as hot as possible. It is obvious now that the weight must assist the atmosphere in holding the diaphragm down, and to accomplish this the weight is placed on the right of the fulcrum and the action is the same as in the ordinary automatic damper-regulator attached to low-pressure steam-boilers. The position of the weight will again determine the temperature at which the dampers will be closed. This time the temperature will be above 212° Fahrenheit.

As no vapor or steam ever goes into C and only a small amount of water through the pipe $m$, the water in C will remain comparatively cool. In the drawings the position of C is shown directly above A and B; but it is obvious that it may be placed at any point which is convenient for operating the draft-doors. The pipe $m$, connecting B and C, may be made long and need not be straight.

My damper-regulator may be operated in another way, as follows: A small quantity of some volatile substance, which boils at a lower temperature than water and will not mix with water, such as kerosene or gasolene, may be put into the upper part of the vessel B. The heat in A will cause this substance to evaporate and push the water from the bottom of B up into the lower part of C and force the diaphragm up. In using the regulator in this way it might never be necessary to place the weight on the left of the fulcrum.

If the elastic diaphragm be made of rubber, as is the common practice, it is desirable that only water come in contact with it, for such volatile substances as are usually used in the place of water in similar regulators affect injuriously the rubber.

What I claim as my invention, and desire to secure by Letters Patent, is—

A damper-regulator comprising in combination with the vessel A adapted to receive heated water, a liquid-containing receptacle B positioned therein and provided with a neck held in a suitably-packed aperture in said vessel, an expansion-chamber C with a diaphragm passing horizontally and centrally through the same, a standard rising from the wall of said chamber, a weighted lever pivoted on said standard, disks secured on the opposite sides of said diaphragm, link connection between the shank portion of one of said disks and said lever, a threaded cap over the end of the neck of said receptacle B, a valve-pipe communicating with a duct leading through the wall of said cap, a pipe $m$ communicating between the portion of said chamber below the diaphragm, and said receptacle adjacent to the lower end thereof, as set forth.

In testimony whereof I have signed my name to this specification in the presence of the two subscribing witnesses.

DAVID CARLISLE HUMPHREYS.

Witnesses:
 W. LE C. STEVENS,
 L. W. SMITH.